(12) United States Patent
Guy

(10) Patent No.: US 7,179,032 B2
(45) Date of Patent: Feb. 20, 2007

(54) BLIND RIVET

(75) Inventor: Michael Paul Guy, Warley (GB)

(73) Assignee: Newfrey LLC, Newark, DE (US)

( * ) Notice: Subject to any disclaimer, the term of this patent is extended or adjusted under 35 U.S.C. 154(b) by 84 days.

(21) Appl. No.: 10/767,965

(22) Filed: Jan. 28, 2004

(65) Prior Publication Data

US 2005/0008455 A1    Jan. 13, 2005

Related U.S. Application Data

(63) Continuation of application No. PCT/EP02/09130, filed on Aug. 15, 2002.

(30) Foreign Application Priority Data

Aug. 16, 2001    (GB) .................................. 0120020.3

(51) Int. Cl.
*F16B 19/10*    (2006.01)
*B21J 15/04*    (2006.01)

(52) U.S. Cl. .................... 411/34; 411/377; 248/74.2
(58) Field of Classification Search .................. 411/34, 411/43, 396, 400, 377, 375; 248/71, 74.1, 248/74.2; 24/457

See application file for complete search history.

(56) References Cited

U.S. PATENT DOCUMENTS

| 1,449,779 | A | * | 3/1923 | Race ............................ 411/375 |
| 2,346,769 | A | * | 4/1944 | Lichtor ......................... 52/508 |
| 3,309,747 | A | * | 3/1967 | Smith ............................ 24/688 |
| 3,452,638 | A |   | 7/1969 | Lauer |
| 4,170,920 | A |   | 10/1979 | Siebol |
| 4,601,624 | A | * | 7/1986 | Hill ............................ 411/373 |
| 4,904,133 | A |   | 2/1990 | Wright |
| 4,943,197 | A | * | 7/1990 | Baritz ......................... 411/375 |
| 5,014,939 | A | * | 5/1991 | Kraus et al. ................... 248/70 |
| 5,513,422 | A | * | 5/1996 | Wen-Lung ..................... 24/92 |
| 6,715,721 | B2 | * | 4/2004 | Buck .......................... 248/74.2 |

FOREIGN PATENT DOCUMENTS

| FR | 1 302 907 | 7/1962 |
| FR | 1 390 540 | 1/1965 |
| GB | 1 439 812 | 6/1976 |
| GB | B1 462 409 | 1/1977 |
| GB | 1 552 235 | 9/1979 |
| WO | WO 97/25538 | 7/1997 |

OTHER PUBLICATIONS

International Search Report mailed Nov. 12, 2002, re International Application No. PCT/EP02/09130, filed Aug. 15, 2002 (WO 03/016726 A1).

* cited by examiner

*Primary Examiner*—Flemming Saether
(74) *Attorney, Agent, or Firm*—Harness, Dickey & Pierce, P.L.C.

(57) ABSTRACT

There is described an expanding blind rivet assembly having a flange (3) provided with an undercut surface facing the rivet shank. A resilient cap (20) is formed with a cavity (22) having an opening surrounded by an undercut surface (23) within the cavity, so that the cap may be snap-engaged over the flange of the rivet after setting. The cap provides abrasion and corrosion protection for the flange. The cap (20) may also be provided with securing means for securing a further component to the cap (20).

12 Claims, 6 Drawing Sheets

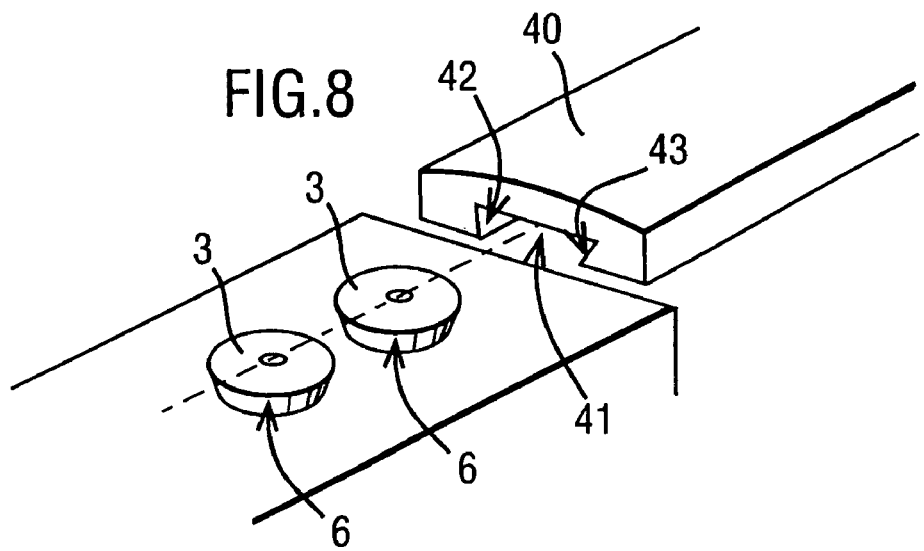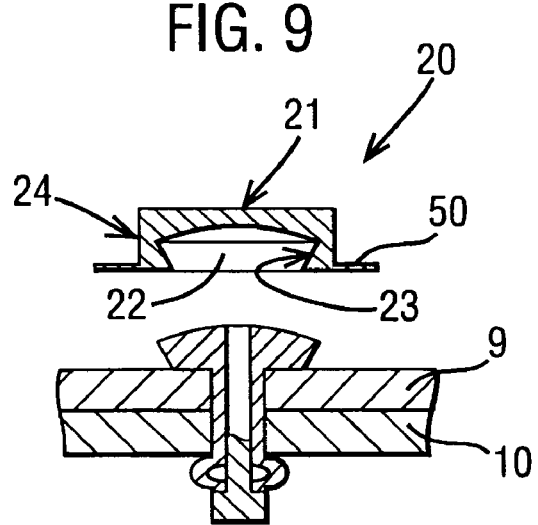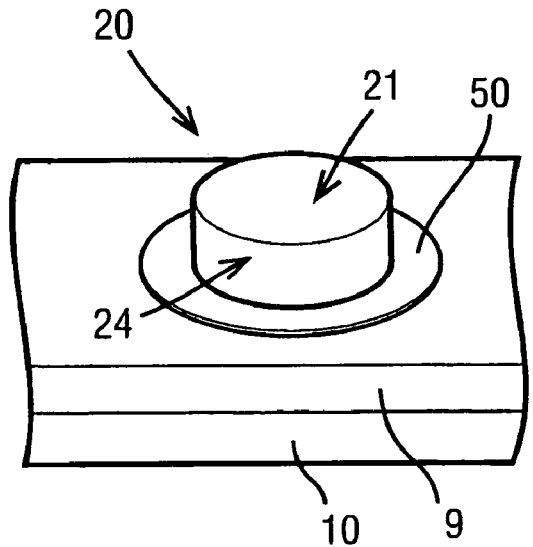

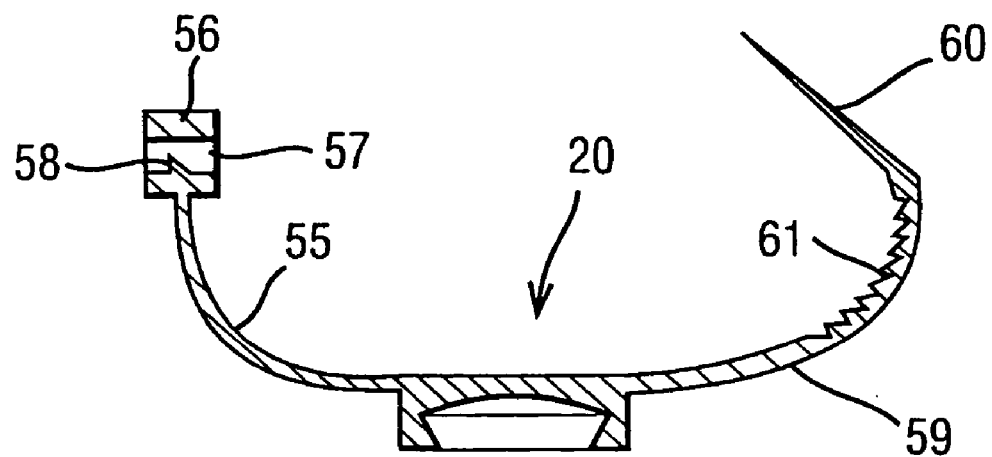
FIG. 11
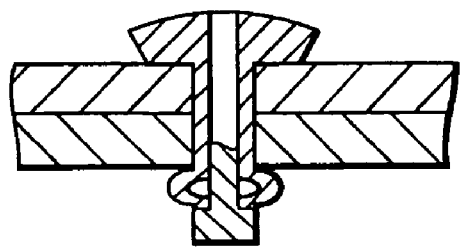
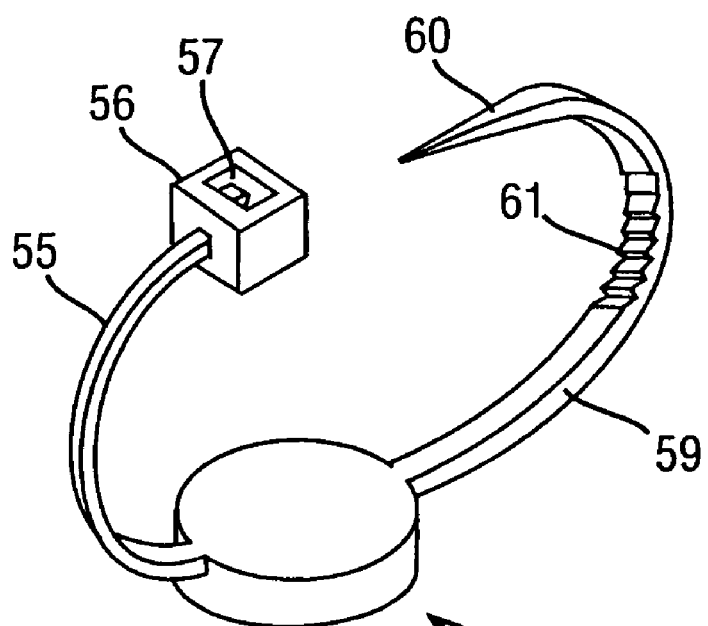
FIG. 12

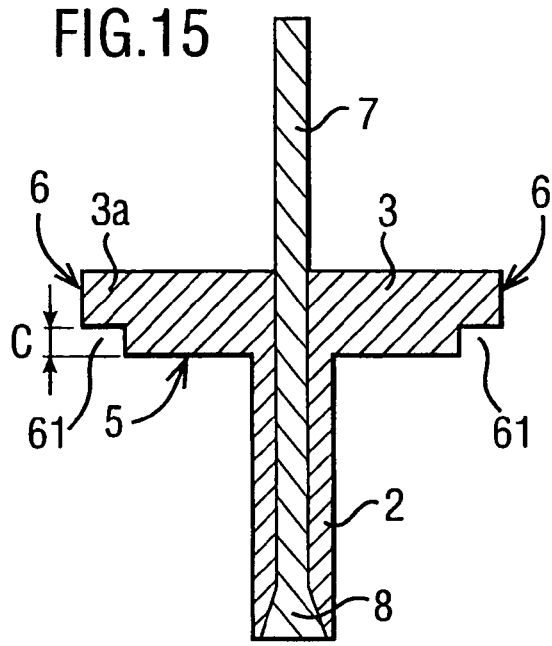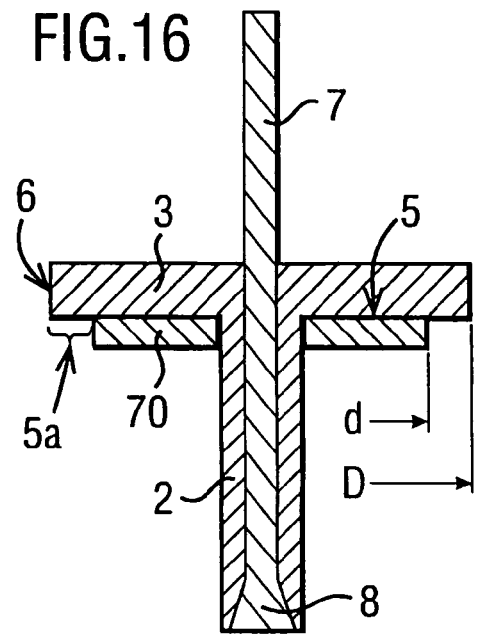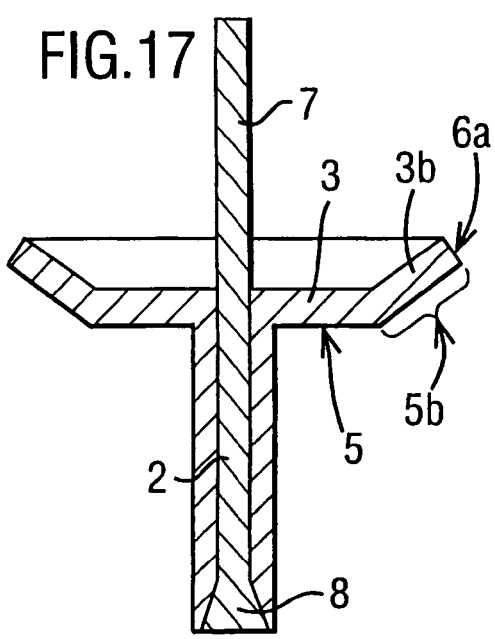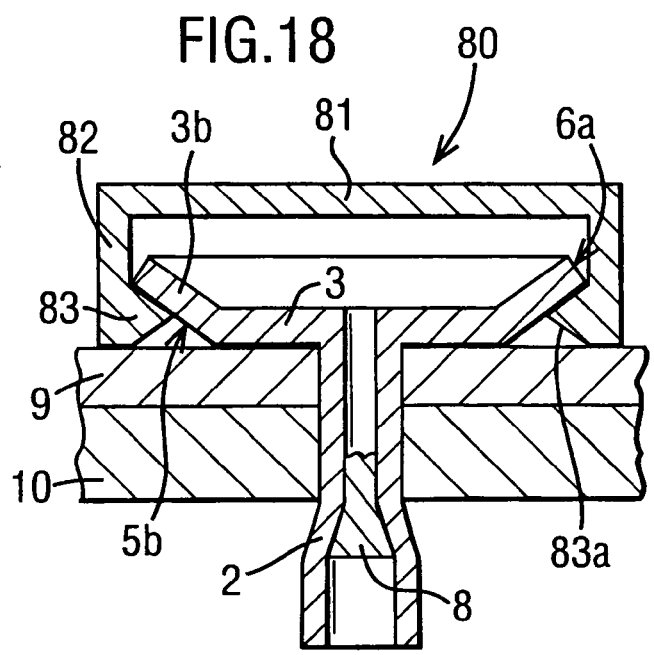

BLIND RIVET

CROSS-REFERENCE TO RELATED APPLICATIONS

The present application is a continuation of pending International Patent Application PCT/EP02/09130, filed Aug. 15, 2002 which designates the United States and which claims priority of Great Britain patent application 0120020.3, filed on Aug. 16, 2001.

FIELD OF THE INVENTION

The present invention relates to fastenings for sheet materials, and is particularly concerned with blind rivet fastenings.

BACKGROUND OF THE INVENTION

A conventional blind rivet fastening has a tubular shank with an external flange at one end, and a stem extending through the shank. A first end of the stem protrudes from the flanged end of the shank, and a second end of the stem has a head whose outer diameter corresponds to the outer diameter of the shank, and which abuts the end of the shank remote from the flange. To join two sheets of material together with the rivet, aligned holes with a diameter corresponding to the external diameter of the shank are formed in the sheets, and the shank is inserted through the aligned holes until the flange rests on one of the sheets of material. Holding the flange of the shank in this position, a tensile force is applied to the stem so that the head of the stem applies compression to the tubular shank. Depending on the geometry of the head and the shank, the head may be pulled into the shank while the wall of the shank is deformed outwardly to a greater diameter, or the head may remain at the end of the shank and the wall of the shank may buckle outwards. Tensile force is applied to the stem until, at a predetermined maximum force, the stem breaks off. The head of the stem is either retained within the shank, or may fall away after the stem breaks.

SUMMARY OF THE INVENTION

Blind rivets of the types described above are widely used in industry for joining components in sheet metal fabrications. Conventionally, if further components have to be fixed to a sheet metal fabrication, then additional fasteners are required to secure such components. The provision of additional fasteners adds expense to the manufacture of the fabrication, in that not only are additional components required, but additional labour is necessary for attaching the components to the assembly.

An objective of the present invention is to reduce the cost of producing sheet metal fabrications, by reducing the need for additional placement of fasteners to secure secondary components to the assembly.

A further objective of the present invention is to provide a means of concealing and protecting the exposed heads of blind rivets after setting.

According to a first aspect of the present invention, there is provided a blind rivet assembly comprising a tubular shank having an external flange at one end, a stem extending through the shank and having a head abutting the end of the shank remote from the flange, characterised in that the flange is provided with a peripheral undercut surface facing towards the shank.

A second aspect of the present invention provides a method of mounting a second component to a blind rivet after setting, the method comprising: providing a blind rivet having a tubular shank with an external flange and a peripheral undercut surface on the flange, setting the rivet so that the undercut surface of the flange faces towards a surface of the material in which the rivet is set, providing an undercut cavity in a second component into which the flange of the rivet is receivable and which includes an undercut surface engageable with the undercut surface of the flange, and snap-engaging the cavity of the second component over the flange of the rivet.

The second component may be a simple protective cap to cover the flange, or may be a functional component such as a cable clamp, a wire tie, or other structure for retaining further parts to the riveted assembly.

BRIEF DESCRIPTIONS OF THE DRAWINGS

Embodiments of the invention will now be described with reference to the accompanying drawings, in which:

FIG. 8 is a perspective view showing two rivet flanges used to retain an elongated component;

FIGS. 9 and 10 are sectional and perspective views, respectively, of a rivet with a tamper-evident cap;

FIGS. 11 and 12 are sectional and perspective views, respectively, of a cable tie integrally moulded with the rivet cap.

FIG. 15 is a sectional view, similar to FIG. 1, of a second rivet assembly;

FIG. 16 is a sectional view of a third rivet assembly according to the invention;

FIG. 17 shows a sectional view of a fourth rivet assembly according to the invention;

FIG. 18 is a view of the rivet of FIG. 17 set and with a cap applied.

DETAILED DESCRIPTION OF THE PREFERRED EMBODIMENTS

Figure 1:
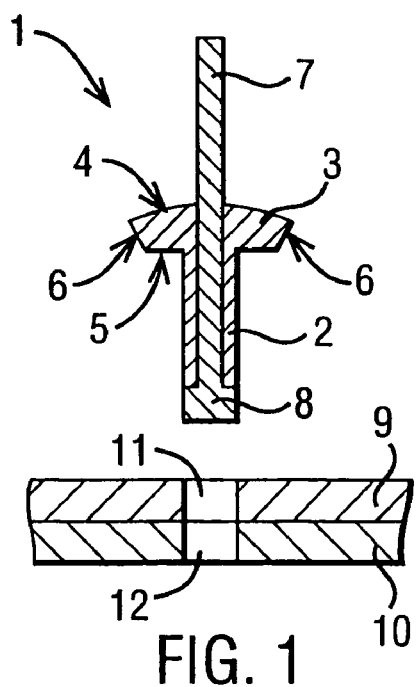
FIGS. 1 to 4 are sectional side elevations of a first rivet assembly of the present invention, showing the setting sequence for the rivet assembly.
Figure 2:
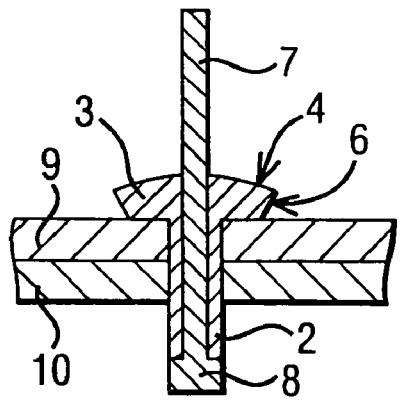

Referring now to the drawings, FIGS. 1 to 4 show the setting sequence for the rivet. The rivet 1 comprises a tubular shank 2 at the upper end of which (as shown in the Figures) is a radially outwardly extending flange 3. The upper surface 4 of the flange 3 is domed, and the undersurface 5 of the flange 3 is planar and perpendicular to the tubular shank 2. The outer peripheral surface 6 of the flange 3 is tapered inwardly and downwardly in this embodiment, to provide a conical surface tapering towards the lower end of the rivet 1. A stem 7 extends through the tubular shank 2 and protrudes beyond the domed surface 4 of the flange 3. The stem 7 extends longitudinally through the tubular shank 2, and has a radially enlarged head 8 whose outer diameter is substantially equal to the outer diameter of the tubular shank 2, in contact with the end of the shank 2 remote from the flange 3.

The sequence of FIGS. 1 to 4 shows the use of a rivet to join together two sheets 9 and 10 of material such as sheet metal. The sheets 9 and 10 are first formed with respective bores 11 and 12, whose diameter is substantially equal to the external diameters of the head 8 of the stem 7 and of the tubular shank 2. The bores 11 and 12 are aligned, as seen in FIG. 1, and the head 8 and shank 2 of the rivet 1 are then inserted through the bores 11 and 12. The undersurface 5 of the flange 3 contacts the sheet 9 wherein the rivet 1 is fully inserted, and the peripheral surface 6 of the flange is inclined and faces towards the upper surface of the sheet 9 to form an undercut extending around the edge of the flange 3.

Figure 3:
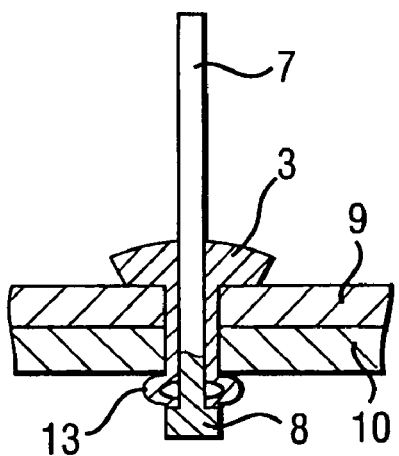

Once the rivet 1 has been fully inserted, downward pressure is exerted on the upper surface 4 of the flange 3, and a tensile force is applied to the protruding stem 7, to draw the head 8 of the stem towards the flange 3. As shown in FIG. 3, this causes the lower end of the tubular flange to which is unsupported by the bores 11 and 12 to buckle outwardly to form an enlarged region 13, preventing removal of the rivet from the aligned holes, and drawing the two sheets 9 and 10 into close contact.

Figure 4:
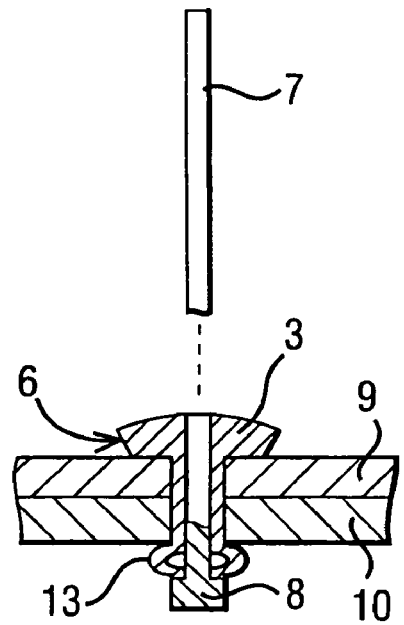

When a predetermined tensile force is exceeded, the stem 7 breaks and the protruding part of the stem 7 is removed from the flange 3, as seen in FIG. 4. The stem 7 may break at a point spaced from the head 8, leaving the head 8 and a portion of the stem 7 within the shank 2, as seen in FIG. 4. Alternatively, if the stem is weakened so as to break at its junction with the head 8, the stem 7 may be entirely removed through the flange 3 and the head 8 may fall away from the end of the shank 2.

Figure 5:
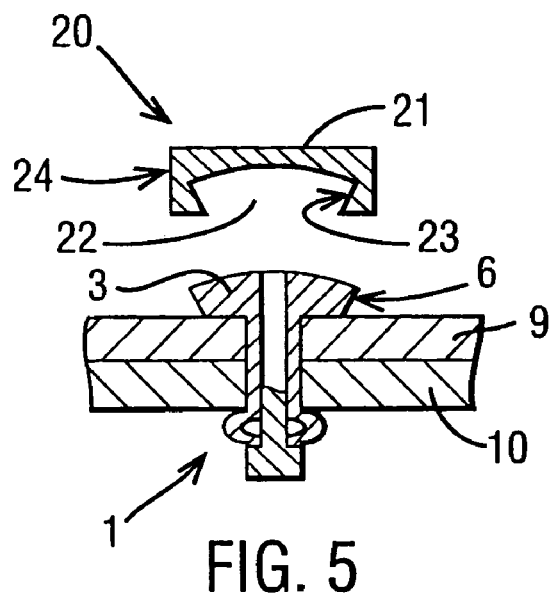
FIG. 5 is a sectional side elevation showing a cap for fitting to the rivet flange.

FIG. 5 shows a first embodiment of the present invention. In order to protect the exposed flange 3 of the rivet 1 from abrasion and corrosion, a cap 20 is provided. The cap 20 is generally disc-like in shape, with a substantially flat upper surface 21. The undersurface of the cap 20 is formed with a cavity 22, shaped so as closely to receive the flange 3 of the rivet 1. The cavity 22 has an undercut peripheral surface 23 angled to correspond with the peripheral surface 6 of the flange 3 of the rivet 1.

The cap 20 is made from resilient material such as synthetic plastics material, and is resiliently deformable so that the cap 20 may be press-fitted onto the flange 3 of the rivet 1. A sealant material may be provided within the cavity 22 to be extruded therefrom as the cap 20 is fitted to the flange 3 in order to create a hermetic seal between the cap 20 and the flange 3. Sealant material may alternatively be applied to the flange of the rivet prior to fitting the cap.

The cap 20 shown in FIG. 5 has a substantially cylindrical outer peripheral wall 24. It is foreseen that the wall 24 may be tapered in the axial direction of the cap, so that the cap is substantially truncated conical in form with the cavity 22 formed in the base of the truncated cone. Such an arrangement will minimise the likelihood of cables or the like snagging on the cap when used.

The resilient engagement between the undercut surface 23 of the cavity 22 and the undercut surface 6 of the flange 3 retains the cap 20 onto the flange of the rivet. In order to take full advantage of this retention, a retaining or gripping structure may be integrally moulded with the cap 20 so that the rivet and cap may be used to retain a secondary component to the sheets 9 and 10 which the rivet secures together. Such a component is shown in sectional view in FIG. 6, and in perspective in FIG. 7.

Figure 6:
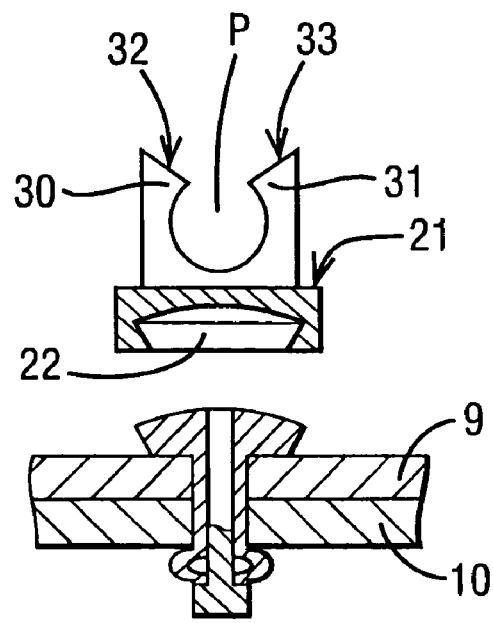
FIGS. 6 and 7 are sectional and perspective views, respectively, of a pipe clamp integrally moulded with the rivet cap.
Figure 7:
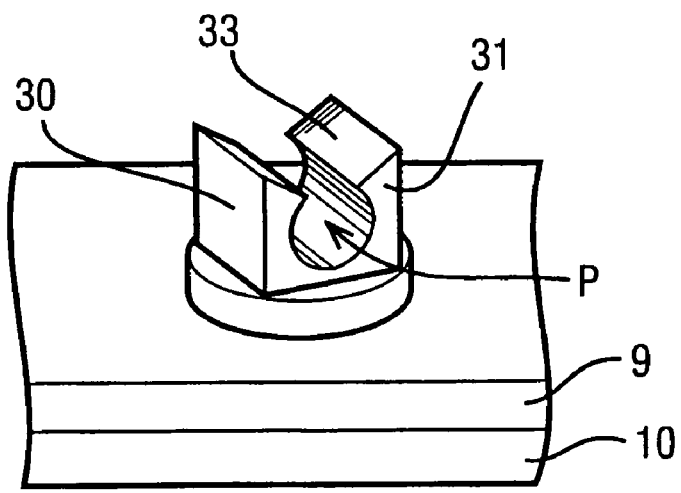

Referring now to FIG. 6, the cap 20 is formed with the cavity 22 to engage the flange 3 of the rivet 1, and on the upper surface 21 of the cap, a resilient clamp formation for receiving a cylindrical object such as a pipe is formed. The clamp formation comprises a pair of cantilever arms 30 and 31 whose adjacent surfaces are shaped to form a part-cylindrical passage P. A pair of angled lead-in surfaces 32 and 33 are formed at the ends of the respective arms 30 and 31.

In use, the rivet 1 is first set to join together the two sheet components 9 and 10, and the cap 20 is snap-fitted to the flange 3 of the rivet 1. A cylindrical object such as a pipe is then placed on the lead-in surfaces 32 and 33 of the arms 30 and 31, and downward pressure on the pipe causes the arms 30 and 31 to flex apart due to the camming action of the lead-in surfaces on the surface of the pipe. The pipe can then pass into the passage P between the arms 30 and 31, to be retained therein by the resilient action of the arms.

FIG. 8 shows an application for the rivet of the invention, wherein a plurality of rivets are aligned in the assembly and an elongate component, such as a decorative trim strip 40, is attached to the sheet metal assembly by means of an undercut groove 41. The groove 41 has a pair of undercut side surfaces 42 and 43 which engage the undercut surfaces 6 of the flanges 3 of the rivets. The trim strip 40 may be applied to the rivets by first engaging one of the side surfaces 42 with the surfaces 6 of the rivets 1, and then flexing the trim strip 40 so as to open the slot 41 to enable the flanges 3 to enter the slot. When the strip 40 is released, the surface 43 engages the surfaces 6 of the flanges of the rivets to retain the trim strip 40 in place. Alternatively the strip 40 may be aligned with the rivet flanges and slid into engagement in the longitudinal direction of the strip.

In an alternative embodiment (not shown) an elongate component such as a trim strip 40 may be provided with a number of individual cavities each corresponding in size and position to the flange 3 of a rivet in the main assembly to which the strip is to be attached. The strip is then attached by aligning the cavities with their respective rivets and push-fitting the strip at each attachment location. The strip 40 is preferably a resilient plastics component, but could be a sheet metal channel section with inwardly-turned flanges at the open side of the channel to engage the undercut surfaces 6 of the flanges 3 of the rivets 1.

FIGS. 9 and 10 show a further embodiment of the invention, intended to provide a tamper-evident cap for the rivet 1. As seen in cross-section in FIG. 9, the cap 20 has a thin frangible flange 50 extending radially outwardly from the peripheral surface 24 of the cap 20, substantially co-planar with the undersurface of the cap 20. The cap 20 is applied to the flange 3 of the rivet 1 as described in relation to FIG. 5, and the flange 50 is thus positioned in contact with the surface of the sheet material 9.

The flange 50 may be a thin flange of plastics material moulded integrally with the cap 21, or may be a frangible material such as paper or metallic foil, bonded to the underside of the cap 20. The flange 50 may be provided with a contact adhesive on its undersurface, to secure the flange 50 to the sheet material 9 when the cap is in place. The objective of the tamper-evident cap is that the structural weakness of the flange 50 will cause the flange 50 to be deformed or ruptured if any attempt is made to remove the cap 20 from the flange 3 of the rivet 1. The tamper-evident cap may carry unique identifying indicia on either the flange 50 or the upper surface 21 of the cap. With the tamper-evident cap shown in FIGS. 9 and 10, any attempt to remove the rivet 1, such as to substitute a component of the sheet metal fabrication for a replacement, will be detectable by the destruction of the flange 50 of the tamper-evident cap.

If the cap is removed and a new cap placed in its stead, the difference in the unique identifying numbers on the original cap and the replacement cap will clearly show that a substitution has been made.

FIGS. 11 and 12 show a further embodiment of the invention, wherein a cable tie structure is integrally moulded with the cap 20. The cable tie structure comprises a first flexible band 55 extending radially from one side of the cap 20 and having at its free end a head 56 with a through passage 57. Within the through-passage is a ratchet tooth 58. The cable tie assembly further comprises a second flexible band portion 59 extending from a diametrically opposite side of the cap 20 to the band 55. The band portion 59 has a tapered inserting end 60, and a series of ratchet teeth 61 formed along one face of the band portion 59. The cable tie is positioned by first setting the rivet as described in relation to FIGS. 1 to 4 and then applying the cap as described in relation to FIG. 5. The flexible band portions 55 and 59 are then passed around a bundle of cables, and the insertion end 60 is passed through the passage 57 of the head 56 so that the ratchet teeth 61 of the band portion 59 sequentially engage the ratchet tooth 58 of the head 56 as the band is tightened. Engagement of the tooth 58 with one of the teeth 61 will prevent withdrawal of the band portion 59 from the passage 57, and retain the cables in a bundle.

Figure 13:
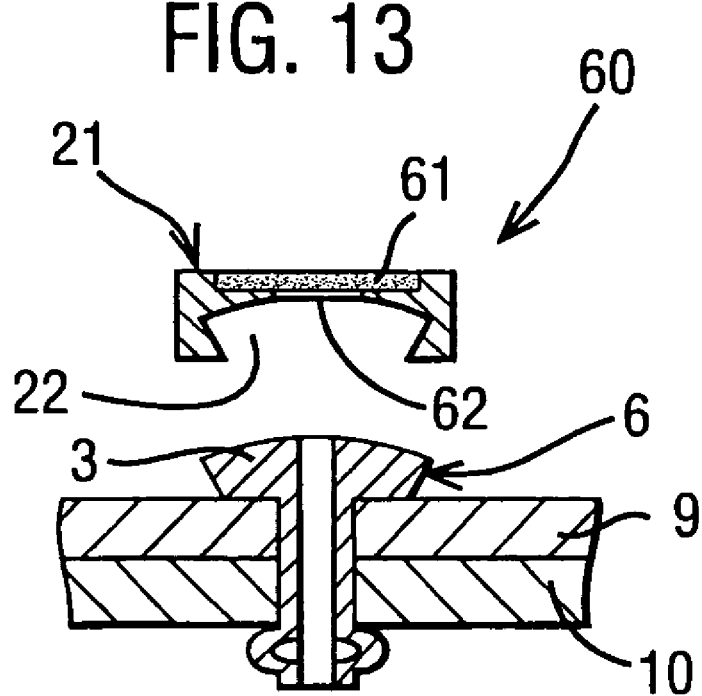
FIGS. 13 and 14 are sectional and perspective views, respectively, of a rivet with a vented cap.
Figure 14:
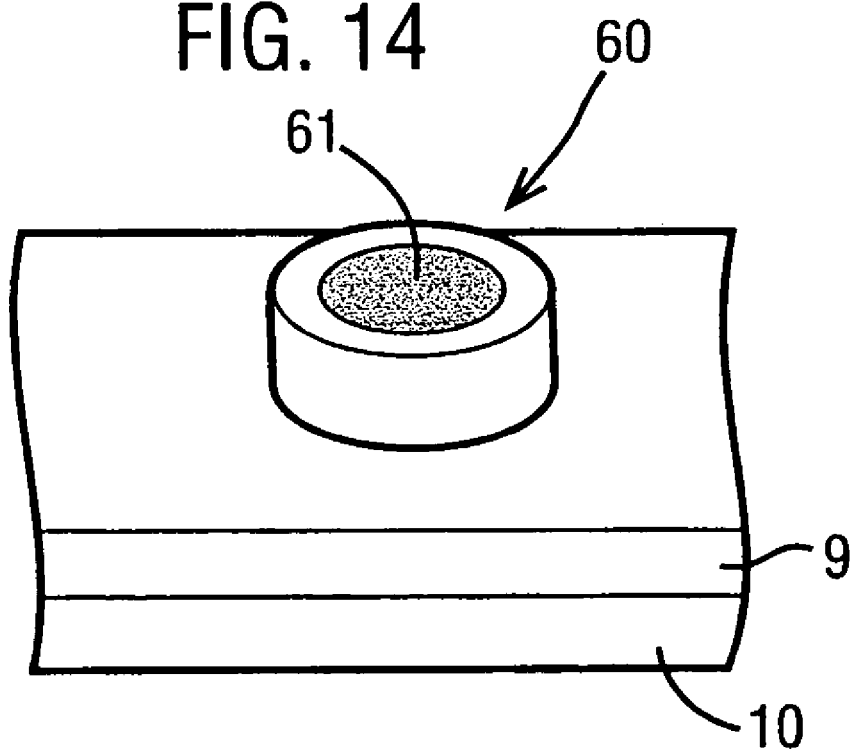

FIGS. 13 and 14 are sectional and perspective views, respectively, of a rivet wherein the stem 7 and head 8 are completely removed from the rivet during the setting process, so that the tubular shank 2 of the rivet provides fluid communication between the two faces of the sheets 9 and 10 which the rivet fixes together. To protect the flange 3 of the rivet, and to provide venting between the two faces of the sheet materials 9 and 10, a venting cap 60 is provided.

The venting cap 60 is similar in form to the cap 20 shown in FIG. 5, but has a central recess in its upper surface 21 to accommodate a filter mesh 61, and has a central through hole 62 which provides fluid communication between the cavity 22 and the upper surface 21 of the cap 60.

In use, the rivet is set as described as above, but the stem 7 of the rivet is weakened adjacent the head 8 so that the stem and head are completely removed when the rivet is set, leaving the tubular shank 2 of the rivet unobstructed. The vent cap 60 is snap-engaged onto the undercut surfaces 6 of the flange 3 of the rivet, as previously described. When the cap is in place, the through hole is aligned with the tubular shank 2 of the rivet 1, so that fluid communication is established between the upper and lower faces of the sheets 9 and 10 respectively.

While the above embodiments of the invention include the provision of pipe clamps, cables ties, tamper-proof flanges and vent openings, it is foreseen that any suitable structure may be formed integrally with the cap 20 in order to held in place by one or more of the rivets according to the invention.

The rivet of the invention thus provides a convenient means by which secondary components can be attached to a fabricated sheet metal structure, using the rivets which secure the structure together as attachment points for the secondary components.

A second type of rivet according to the invention is shown in FIG. 15. While the undercut surfaces of the flange of each rivet are described and illustrated above as conical edge surfaces, in the rivet of FIG. 15 the peripheral surface 6 of the flange 3 of the rivet is formed with a rebate 61 adjacent the undersurface 5 of the flange 3, to form a radially outwardly extending flange region 3a spaced axially from the undersurface 5 of the flange 3 of the rivet to provide a clearance C between the radially-outwardly extending flange region 3a and the surface of a sheet to which the rivet is attached.

In a further alternative embodiment, illustrated in FIG. 16, a conventional blind rivet having a flange 3 with a planar undersurface 5 and a cylindrical, i.e. non-undercut peripheral surface 6 may be modified by adding a spacing component 70 such as a washer to the shank of the rivet. The washer 70 is fitted over the shank 2 and contacts the undersurface 5 of the flange of the rivet. By making the outer diameter d of the washer less than the diameter D of the undersurface 5 of the flange 3, a peripheral region 5a of the undersurface of the flange forms an undercut surface when the rivet is set in a workpiece with the washer 70 in place between the flange 3 and the workpiece.

In a yet further embodiment of the rivet, illustrated in FIGS. 17 and 18, the flange 3 of the rivet has its peripheral region 36 dished so that the central region of the underside 5 of the rivet contacts a workpiece in which the rivet is set, and a peripheral region 5b of the undersurface of the flange is inclined away from the workpiece in the radially outward direction.

FIG. 18 shows the rivet of FIG. 17 set in aligned holes in two sheets 9 and 10 of material, securing the sheets together. In contrast to the rivets shown in FIGS. 1 to 14, the rivets of FIGS. 15 to 18 have a stem 7 with a conical head 18 tapering towards the stem 7. The head 8 of the rivet is received in a conical section of the tubular shank 2 of the rivet, so that in the unset condition (seen in FIGS. 15 to 17) the head 8 is within the end of the shank 2 remote from the flange 3. As the stem 7 is drawn upwardly (as seen in the Figures), the conical head 8 expands and deforms the tubular shank 2 of the rivet. When the head 8 reaches a point where further movement up the shank is prevented, by the sheet material 10 preventing expansion of the shank, the stem 7 breaks and the head 8 is retained in position by the elasticity of the shank material. Stem 7 is removed through the flange 3.

FIG. 18 shows a set rivet with a dished flange, to which a cap 80 has been fitted. The cap 80 comprises a disc-like top 81, a depending skirt 82, and a radially upwardly extending rib 83 formed on the skirt 82. The cap 80 is formed from resilient material, so as to be sufficiently flexible to enable the cap to be snap-engaged over the flange 3 of the rivet to the position of FIG. 18, wherein the rib 83 engages the inclined undersurface 5b of the flange. In the embodiment shown, the undersurface 83a of the rib 83 is inclined to form a tapered lead-in surface, and the edge surface 6a of the flange is inclined so that when the cap 80 is first placed on the flange 3, the surfaces 83a and 6a engage to align the cap 80 and the flange 3. Pressure on the cap causes a cam action between the surfaces 6a and 83a, resiliently expanding the skirt 82 to enable the rib 83 to snap over the flange and then contract to the position shown in FIG. 18 with the upper surface of the rib 83 engaging the undersurface 5b of the flange 3.

The cap 80 may be formed with securing structures or tamper evident structures, as described in relation to FIGS. 6 to 13.

The rib 83 may be discontinuous, or may be a series of spaced rib portions extending on the interior surface of the skirt 82. Alternatively, the skirt 82 may be turned inwardly at its free end to provide an undercut surface to engage the undersurface 5a or 5b of the rivet flange.

The invention claimed is:
1. A blind rivet assembly comprising:
a tubular shank;

a radially outwardly extending flange at one end of the shank, the flange homogenously joined to the shank and including:
   a substantially planar first surface;
   a domed second surface convexly curving outwardly away from the first surface; and
   an outer peripheral undercut surface tapering inwardly from the domed second surface to the first surface;
a stem extending through the shank and having a head situated adjacent the end of the shank remote from the flange; and
a cap disposable about the flange having a cavity snap engaged over the flange and having an undercut surface engaged with the surface of the flange.

2. A blind rivet assembly according to claim 1, wherein the stem extends through the shank, and the head is positioned outside the shank.

3. A blind rivet assembly according to claim 1, wherein the flange is circular in outline and the outer peripheral surface is a conical edge surface of the flange.

4. A blind rivet assembly according to claim 1, wherein the cap is resiliently deformable to be engageable onto the flange, the cap comprising:
   a second surface opposed to the first surface having opposed cantilever arms extending away from the second surface, the cantilever arms defining a partial-cylindrical passage adapted to receive a tubular shaped object.

5. A blind rivet assembly according to claim 4, wherein the cap being formed from a resilient polymeric material.

6. A blind rivet assembly according to claim 5, wherein each of the cantilever arms comprise a lead-in surface formed at a distal end angled with respect to the second surface.

7. A blind rivet assembly according to claim 6, wherein the opposed cantilever arms further define a pipe clamp.

8. A blind rivet assembly, comprising:
a tubular shank having first and second ends;
a radially outwardly extending flange homogenously joined to the first end of the shank, the flange including an outwardly facing surface having a convexly curving domed shape and an oppositely facing planar surface facing towards the second end and oriented substantially perpendicular to the shank;
an undercut surface of the flange facing towards the second end of the shank;
a stem slidably positionable within the shank, the stem including a radially enlarged head positionable to engage the second end of the shank remote from the flange; and
a cap disposable about the flange having an undercut cavity adapted to receive the flange, and a cap undercut surface engaged with the undercut surface of the flange to removably retain the cap on the flange.

9. A blind rivet assembly operable to join first and second sheets each having co-aligned bores, the blind rivet assembly comprising:
a tubular shank having first and second ends and an outer diameter substantially equal to a diameter of the co-aligned bores, the outer diameter of the tubular shank being slidably receivable within the co-aligned bores;
a radially outwardly extending flange at the first end of the shank, the flange including a first surface having a domed shape positionable facing away from the first and second sheets and a second substantially planar surface oriented substantially perpendicular to the shank and positionable to abut one of the first and second sheets when the shank is received in the co-aligned bores;
the flange including an undercut surface facing towards the second end of the shank;
a stem slidably positionable within the shank, the stem including a radially enlarged head having an outer diameter substantially equal to a diameter of the shank, the head positionable to engage the second end of the shank remote from the flange; and
a cap of a resilient material having a substantially cylindrical outer peripheral wall and a cavity defining an undersurface snap engaged over the flange, the cap further including a cap undercut surface engageable with the undercut surface of the flange to removably retain the cap on the flange.

10. The assembly of claim 9, wherein the cap further comprises a securing formation for attaching a further component to the cap.

11. The assembly of claim 10, wherein the securing formation further comprises a pair of spaced resilient cantilever arms each having a free end and opposed enlargements each proximate to one of the free ends.

12. A blind rivet assembly comprising:
a tubular shank;
a radially outwardly extending flange at one end of the shank, the flange homogenously joined to the shank and including:
   a substantially planar first surface;
   a domed-shaped second surface convexly curving outwardly away from the first surface; and
   an outer peripheral surface tapering inwardly from the domed second surface to the first surface;
a stem extending through the shank and having a head situated adjacent the end of the shank remote from the flange; and
a cap disposable about the flange, the cap having a concave shape corresponding with the domed-shaped surface of the flange to closely and releasably receive the flange.

\* \* \* \* \*